No. 651,010. Patented June 5, 1900.
R. GALLOWAY.
FERTILIZER DISTRIBUTER.
(Application filed Mar. 17, 1900.)
(No Model.) 2 Sheets—Sheet 1.

Witnesses
J. M. Fowler Jr.
Alexander F. Hunt

Inventor
Robert Galloway
by Church & Church
his Attorneys.

THE NORRIS PETERS CO., PHOTO-LITHO., WASHINGTON, D. C.

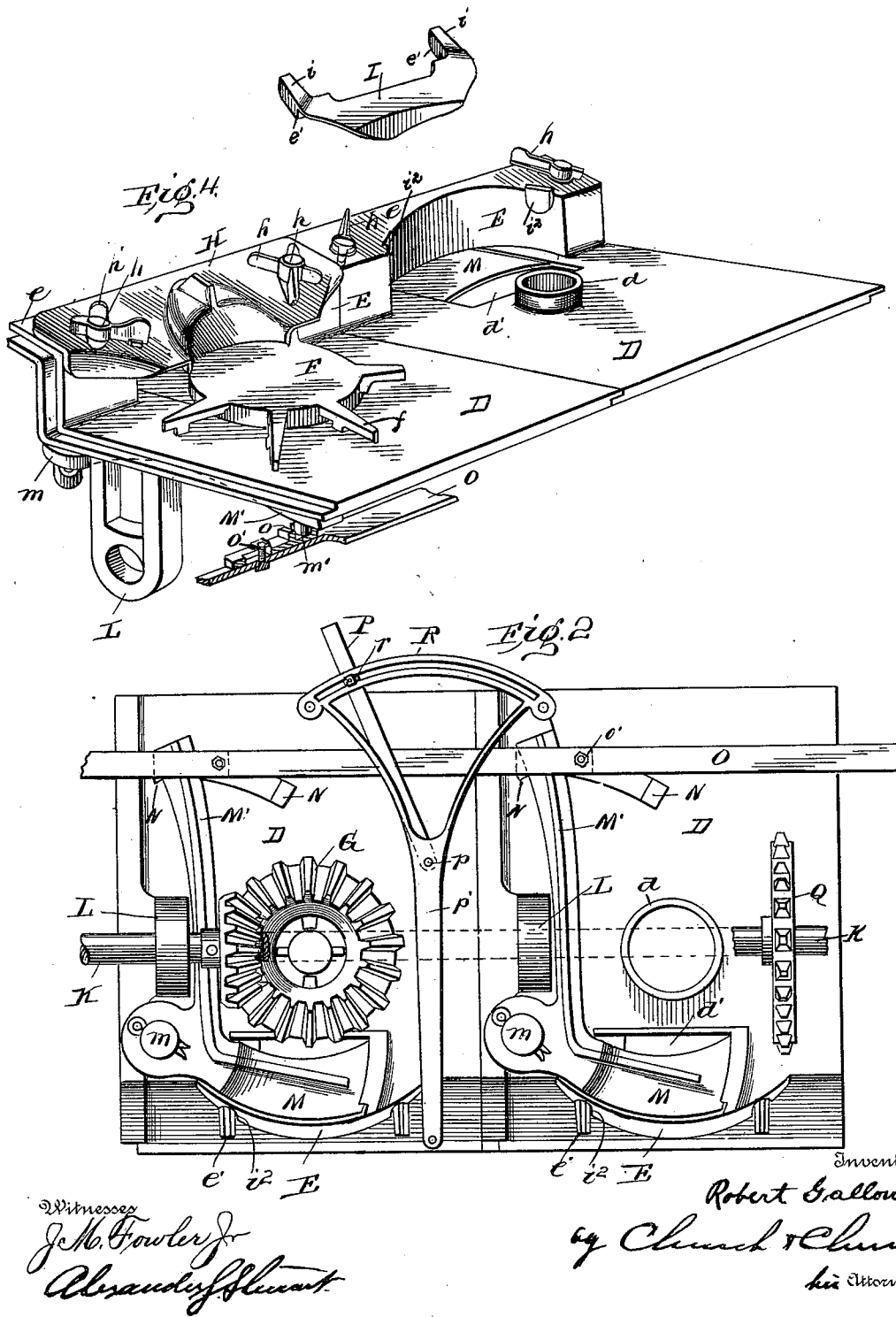

UNITED STATES PATENT OFFICE.

ROBERT GALLOWAY, OF BUFFALO, NEW YORK.

FERTILIZER-DISTRIBUTER.

SPECIFICATION forming part of Letters Patent No. 651,010, dated June 5, 1900.

Application filed March 17, 1900. Serial No. 9,050. (No model.)

*To all whom it may concern:*

Be it known that I, ROBERT GALLOWAY, a citizen of the United States, residing at Buffalo, county of Erie, and State of New York, have invented certain new and useful Improvements in Fertilizer-Distributers; and I do hereby declare the following to be a full, clear, and exact description of the same, reference being had to the accompanying drawings, forming a part of this specification, and to the letters of reference marked thereon.

This invention relates to improvements in fertilizer-distributers, and particularly to that class of distributers used in connection with or as a part of a grain-drill, although it will be understood that features of the invention may be utilized in fertilizer-distributers not combined with a grain-drill, and hence I do not wish to be limited to any particular application of the novel features. In fertilizer-distributers of this class there is a demand for a mechanism which will permit the discharge-openings to be located quite close together; but heretofore the distance between centers of the several distributers has been seven and eight inches, and difficulty has been experienced in making a successful distributer of smaller size—say six inches. The demand for the smaller size arises because of the fact that seed-drills are frequently made to distribute the seed in rows six inches apart, and hence the fertilizer-distributers should be correspondingly arranged.

It is the main object of the present invention to accomplish this result in a satisfactory manner, further objects of the invention being to provide an efficient cleaner for the fertilizer feed-wheel and to prevent the fertilizer from working into the seeding mechanism, to which ends the invention consists in certain novel details of construction and combinations and arrangements of parts, all as will be now described, and the particular features of novelty pointed out in the appended claims.

Figure 1:
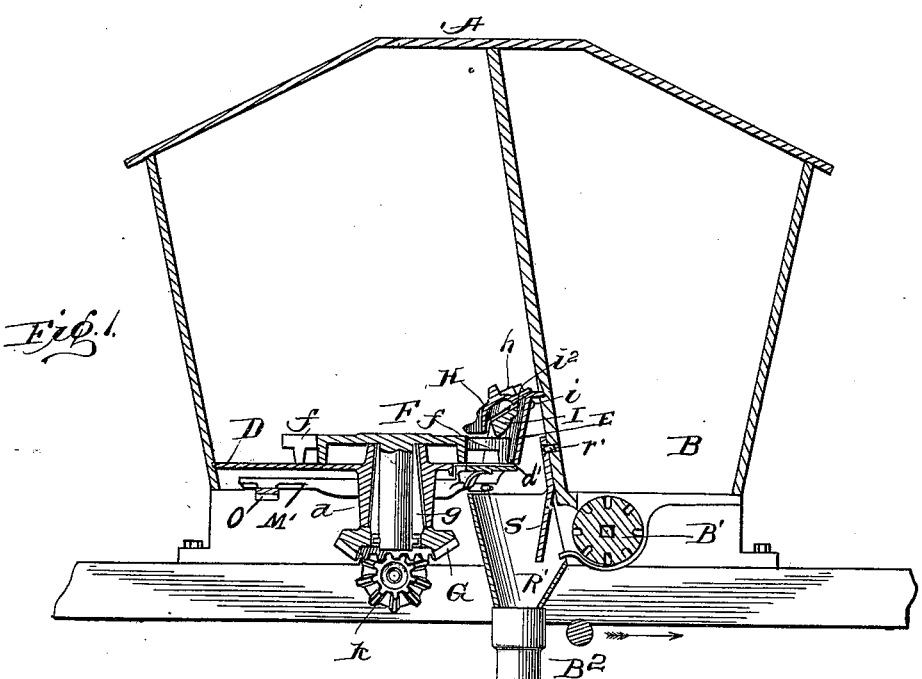
Figure 3:
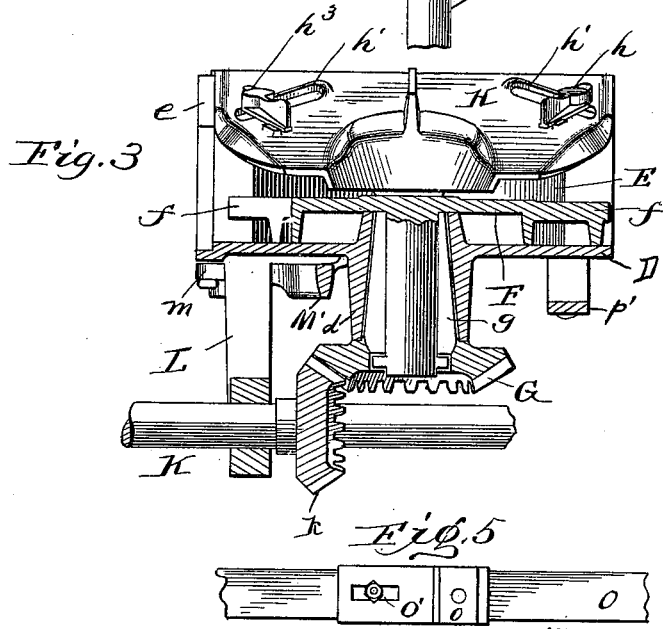
Figure 5:
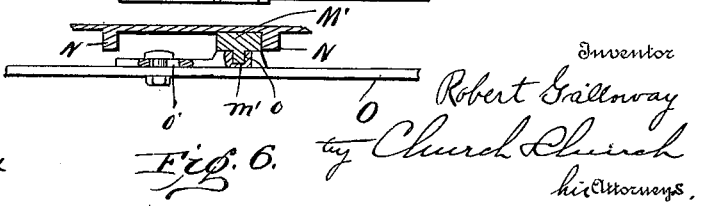
Figure 6:
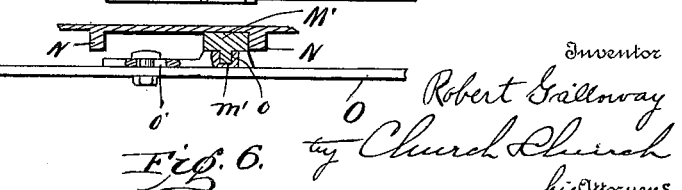

Referring to the accompanying drawings, Figure 1 is a vertical section taken through a fertilizer-distributer and grain-drill embodying my present improvements. Fig. 2 is a bottom plan view of two sections of the distributer. Fig. 3 is a vertical section through one of said sections, taken centrally of the force feed-wheel and at right angles to Fig. 1. Fig. 4 is a detail perspective view showing two of the sections, one with the feed-wheel cover-plate and knocker removed. Fig. 5 is a detail plan, and Fig. 6 is a detail of a vertical section showing an adjustable connection between the operating-bar and cut-off or gate lever.

Like letters of reference in the several figures indicate the same parts.

The hopper A in the accompanying drawings is adapted to contain the fertilizer, and it is preferably, though not necessarily, formed as a part of or chamber in the hopper which is adapted to contain the seed. The compartment for the seed is lettered B and has in its lower portion a grain-cup B', adapted to feed the grain in regulated quantities down into the connecting-tube $B^2$ and so on to the hoe, the grain being preferably discharged by the cup into an intermediate coupling or funnel to be presently described.

In order to facilitate manufacture, the bottom of the fertilizer-hopper A is formed by a series of cast sections or plates D, which parts I shall term herein the "bottom" plates. Each plate is adapted to support and form a portion of the fertilizer-feeding mechanism to be now described. Centrally of each plate there is formed a boss or bearing $d$ and at one side a feed-opening $d'$, such feed-opening $d'$ being located in proximity to a vertical wall E, preferably curved on its face to conform to the radius of the feed-wheel and having an inclined upper surface $e$. The feed-wheel itself is journaled in the bearing $d$ and is preferably formed by a central disk F, having radial arms $f$ and is adapted to be rotated by the upwardly-extending hub or boss $g$ of a bevel gear-wheel G. The arms $f$ of the feed-wheel carry the material around and drop the same through the feed-opening $d'$, the entrance of the material into the feed-opening other than that carried by said arms being prevented by a cover-plate H, resting on the inclined surface $e$ of the bottom plate and adapted to be held in place by turn-buttons $h$. These turn-buttons are made heavier at one end than at the other and pass through slots or openings $h'$ in the cover-plate. Thus when said cover-plate is in position and the turn-buttons turned downwardly they will keep their positions transversely of the slots and lock the cover-plate firmly in place. The turn-buttons being weighted at one end will naturally gravitate down the inclined surface of the cover-plate, and hence there is little or no danger of their accidental release. The front edge of the cover-plate occupies a position in proximity to the edge of the central disk F of the feed-wheel, and in order to effectually discharge the fertilizer from between the arms of the feed-wheel and into the feed-opening $d'$ I provide a cleaner, which instead of being pivotally mounted in the base-plate at a point approximately at the level of the feed-opening, as heretofore, is pivoted at a point above the feed-opening and preferably above the lower edge of the cover-plate. In the accompanying drawings this cleaner is lettered I, and it will be noted that it is adapted to ride upon the arms of the feed-wheels and is itself provided with two rearwardly-extending arms $i$, having hooks or projections $e'$, which pass through apertures $i^2$ in the wall E, close up beneath the inclined surface $e$ or at points above the level of the feed-wheels, whereby the accidental escape of fertilizer through the openings is prevented, and what is of greater importance the pivotal point of the cleaner is located in the best position for securing the most effective action of the cleaner. Furthermore, it will be noted that the cleaner is supported by its arms when the feed-wheel is removed, and hence should one of the arms of the latter be broken off the cleaner will not drop and catch the next feed-wheel arm, as might otherwise be the case.

The feed-wheel and its driving-gear G are adapted to be rotated by a transverse shaft K, extending between the bottom plates and supported in hangers L, extending downwardly from said plates. The shaft K carries a series of bevel-gears $k$, adapted to mesh with the gear-wheels G. Thus when the shaft is rotated the feed-wheels will be rotated in unison, and in order to overcome the difficulty before mentioned and at the same time provide space for the sprocket-wheel, by means of which the shaft K is rotated from the axle, and also for the controlling-lever for the gates I locate the gate-levers between the hangers and the feed-wheel bosses or bearings, thus leaving the opposite sides of the plates free and unobstructed.

If reference be had particularly to Fig. 2, it will be seen that each of the feed-openings $d'$ is adapted to be closed by a gate M, pivoted to the bottom plate at $m$ and having a rearwardly-extending arm or lever M' passing in between the hanger L and the bearing $d$ for the feed-wheels. The extremity of the lever M' works between stops N, also cast on or forming a part of the bottom plate, and said levers are connected by a flat bar O, running transversely of the distributer and in turn adapted to be controlled by a lever P, pivoted at $p$ in a bracket $p'$, running across the bottom plates on the opposite side of the bearing $d$ from the lever M', while the shaft may be driven by a sprocket-wheel Q, mounted on the shaft in a corresponding space beneath bottom plate. The controlling-lever P preferably coöperates with a quadrant R, to which it may be locked by a bolt $r$, Fig. 2, and which will permit of an accurate and minute adjustment of the cut-off gates, so as to feed a greater or less quantity of fertilizer, as desired.

In some instances, owing to variations in castings, difficulty may be experienced in connecting the levers M' with the bar O, so as to secure a uniformity in the several openings, and with a view to permitting of a certain independent adjustment the connections referred to are preferably made adjustable, and I have illustrated in Figs. 5 and 6 a cheap device for accomplishing this end. Each of the levers M' is cast with a pin or projection $m'$ thereon, and the bar O is provided with a socket $o$, adjustably connected therewith by a slot-and-bolt connection $o'$. Thus by moving said socket $o$ longitudinally of the bar the position of the gate may be set accurately and each of the gates may be set so as to move in exact accordance with each of the others, and thus each feed-wheel will feed an equal amount of the fertilizer.

The intermediate coupling or funnel above the tube $B^2$ is lettered R' in Fig. 1, being preferably in the form of a somewhat conical or tapering duct carried by the main hopper independent of the seeding mechanism, the supporting connection being made by a lug $r'$, extended up into the space behind the wall E, and the fertilizer is prevented from dropping onto the seed-cup by a partition S, cast integral with the funnel, extending down to a point below the seed-cup and forming independent passages for the fertilizer and seed until a point in the duct is reached below both the feeding mechanisms.

It will be readily understood that the present arrangement or combination can be applied either to a six, seven, or eight inch fertilizer-distributer and operated in a satisfactory manner.

Having thus described my invention, what I claim as new, and desire to secure by Letters Patent of the United States, is—

1. In a fertilizer-distributer the combination with the base-plate having a substantially-vertical wall at one side with an inclined flange at the top of said wall and a feed-opening in proximity to the base of the wall, of a feed-wheel journaled in the base-plate and having arms adapted to work across the feed-opening, a cover-plate mounted on the inclined flange of the base-plate and having slots therein and turn-buttons adapted to pass through said slots and weighted on one side to prevent their accidental release; substantially as described.

2. In a fertilizer-distributer the combination with the base-plate, the substantially-vertical wall at one side thereof and the feed-wheel journaled in the base-plate and having radial arms, of a cleaner adapted to rest on said arms and pivotally connected with the wall at a point above the level of the feed-wheel arms; substantially as described.

3. In a fertilizer-distributer, the combination with the base-plate, the substantially-vertical wall at one side thereof, the feed-wheel journaled in the base-plate and having radial arms and the cover-plate covering said arms on one side of the feed-wheel, of the cleaner adapted to rest on said arms, and itself having arms pivotally engaging the wall beneath the cover-plate and above the level of the arms; substantially as described.

4. In a fertilizer-distributer, the combination with the base-plate, the substantially-vertical wall at one side thereof having the flange at the top and apertures near the top, the feed-wheel journaled in the base-plate and having radial arms and the cover-plate mounted on the flange and covering the arms at one side of the wheel, of the cleaner adapted to rest on said arms and itself having arms provided with hooks adapted to pass through the apertures in the wall to form a pivotal support above the level of the arms of the feed-wheel; substantially as described.

5. In a fertilizer-distributer, the combination with the base-plate having a central bearing, a depending shaft-hanger and a feed-opening, of a feed-wheel journaled in the central bearing, a drive-shaft for the feed-wheel journaled in the hanger, a gate for the feed-opening pivoted on the base-plate and an operating-lever for said gate extending between the shaft-hanger and central bearing; substantially as described.

6. In a fertilizer-distributer, the combination with the base-plate having a central bearing, a depending shaft-hanger at one side and a feed-opening forward of said central bearing, of a feed-wheel journaled in the central bearing, a drive-shaft for the feed-wheel journaled in the shaft-hanger, a gate for the feed-opening pivotally mounted on the under side of the base-plate, an operating-lever rigidly connected with the gate and extending rearwardly between the shaft-hanger and central bearing and a controlling-lever for the gate pivotally mounted in a bracket on the opposite side of the central bearing; substantially as described.

7. In a fertilizer-distributer, the combination with the feed-wheels, gates for controlling the discharge of fertilizer and operating-levers for said gates, of a connecting-bar for said levers having a series of independently-adjustable sockets thereon, one for each operating-lever; substantially as described.

8. In a fertilizer-distributer, the combination with the fertilizer and seed compartments and the independent feed-wheels for fertilizer and seed, the latter located below the level and in front of the former, of an independent receiving-funnel fastened to the main hopper in front of fertilizer-feed into which the seed and fertilizer are discharged having a partition cast integral therewith and extending downwardly from the fertilizer-feed and forming independent passages for the fertilizer and seed to prevent fertilizer from working into seed-feeding mechanism; substantially as described.

ROBERT GALLOWAY.

Witnesses:
CYRUS S. SMITH,
WALTER P. DIETZER.